UNITED STATES PATENT OFFICE.

EDGAR A. MOORE, OF MANLIUS, NEW YORK.

COMPOSITION FOR ARCHITECTURAL PURPOSES.

SPECIFICATION forming part of Letters Patent No. 504,933, dated September 12, 1893.

Application filed January 6, 1893. Serial No. 457,470. (No specimens.)

*To all whom it may concern:*

Be it known that I, EDGAR A. MOORE, of Manlius, in the county of Onondaga, in the State of New York, have invented new and useful Improvements in a Composition of Matter for Architectural Purposes, of which the following is a full, clear, and exact description.

This invention relates to a composition of materials designed to be put up in a dry pulverous condition in suitable packages for transportation, and which, by addition of a proper quantity of water, is readily worked into a mortar of the desired consistency for plastering therewith either the inside or outside of buildings or forming ornamentations thereon, and which mortar sets at a sufficiently moderate speed to allow it to be properly and conveniently spread, and, when set, it forms a body of superior rigidity and durability.

My said composition consists of the following ingredients, in about the proportions in weight set opposite the same, to wit: fifty (50) per cent. of suitable sand, ten (10) per cent. of land plaster, (raw gypsum,) twelve
(12) per cent. of land plaster calcined, fifteen (15) per cent. of quick lime, ten (10) per cent. of glue, two (2) per cent. of sulphuric acid, one (1) per cent. of kerosene oil. The solidifying materials proper consist of the sand, calcined gypsum and quick lime, the sulphuric acid increases the hardness of the compound when set, the glue and kerosene oil serve to retard the setting of the mortar, and the raw gypsum imparts a glossy finish to the surface of the compound when set. In compounding said ingredients I make two separate mixtures. One mixture is prepared as follows: The land-plaster, (raw gypsum,) calcined land plaster and lime are each to be reduced to a fine pulverulent condition, and these materials I thoroughly mix with the sand, stirring them together, either by means of a hoe or other suitable implement or by means of a suitable machine used for analogous purposes.

The other mixture consists of the dry pulverous glue, acid, oil and quick-lime which are mixed by spreading out the lime and sprinkling over it the said glue, acid and oil and then thoroughly stirring them together. This latter mixture I then add to the first described mixture and thoroughly commingle them by stirring them together. In this manner I produce a dry pulverous compound adapted to be put up either in barrels, or sacks or other suitable packages in which to transport the said compound to the consumer.

What I claim as my invention is—

The composition of matter consisting of sand, raw gypsum, calcined gypsum, quick lime, glue, sulphuric acid and kerosene oil in about the proportions specified.

In testimony whereof I have hereunto signed my name this 2d day of January, 1892.

EDGAR A. MOORE. [L. S.]

Witnesses:
 C. A. LAKIN,
 M. M. THOMAS.